United States Patent [19]

Ishi et al.

[11] 4,068,862
[45] Jan. 17, 1978

[54] SAFETY BAG INFLATION APPARATUS WITH EXTENDIBLE GUARD MEMBER AGAINST CONTACT OF BAG WITH HEATED GAS GENERATOR

[75] Inventors: Takashi Ishi, Sayama; Takuzi Murakami, Tokorozawa; Masayoshi Kato, Shiki; Tadahiko Nagaoka, Tokorozawa, all of Japan

[73] Assignee: Nissan Motor Co., Ltd., Yokohama, Japan

[21] Appl. No.: 621,603

[22] Filed: Oct. 10, 1975

[30] Foreign Application Priority Data

Nov. 20, 1974 Japan .................................. 49-133866
Apr. 30, 1975 Japan .............................. 50-59155[U]
May 24, 1975 Japan .............................. 50-69884[U]

[51] Int. Cl.² ............................................. B60R 21/08
[52] U.S. Cl. ........................................ 280/740; 102/39
[58] Field of Search ................................ 280/728–743; 102/39; 9/316

[56] References Cited

U.S. PATENT DOCUMENTS

| | | | |
|---|---|---|---|
| 3,532,360 | 10/1970 | Leising et al. | 280/736 |
| 3,618,976 | 11/1971 | Leising | 280/740 |
| 3,797,853 | 3/1974 | Grosch et al. | 280/740 |
| 3,799,573 | 3/1974 | McDonald | 280/740 |
| 3,819,205 | 6/1974 | Dunford et al. | 280/731 |
| 3,843,151 | 10/1974 | Lewis | 280/736 |
| 3,891,233 | 6/1975 | Damon | 280/741 |
| 3,907,330 | 9/1975 | Kondo et al. | 280/731 |
| 3,958,949 | 5/1976 | Plantif et al. | 102/39 |

*Primary Examiner*—Joseph F. Peters, Jr.
*Assistant Examiner*—John P. Silverstrim

[57] ABSTRACT

A gas generator including a combustible composition is covered with a guard member, which is adapted in shape to the gas generator and has slits, notches or folds aranged such that the member is locally extended outwards upon actuation of the gas generator to prevent contact of the bag with the heated gas generator.

6 Claims, 5 Drawing Figures

SAFETY BAG INFLATION APPARATUS WITH EXTENDIBLE GUARD MEMBER AGAINST CONTACT OF BAG WITH HEATED GAS GENERATOR

This invention relates to safety apparatus which includes an inflatable bag and a gas generator having a combustible composition for inflating the bag, and more particularly to such apparatus which includes additionally a guard member to protect the bag and any person against contact with the gas generator in a heated state after ejection of gas therefrom.

There are a group of safety apparatus which are characterized by comprising an inflatable bag and a gas generator for inflation of the bag and exemplified by lifeboats and apparatus for protection of car passengers in collision of the car. The gas generator of such apparatus uses in many cases a combustible solid-phase composition as the gas source for several reasons such as compactness, stability during storage and quick response to actuation. The composition evolves a high temperature gas upon combustion, but the bag is made of a relatively poorly heat-resistant material such as cloth or synthetic resin sheet. The gas generator, therefore, usually includes a heat-absorbing material which is arranged to let pass the combustion gas therethrough and lower the gas temperature before discharge of the gas.

It is commonly required that the described apparatus be made as compact as possible in the ready-to-work state. This requirement is particularly severe when the apparatus is mounted on an automotive steering wheel at its central region for the protection of the driver. This requirement cannot be met unless the gas generator is small-sized. The volume of the gas generator is determined mainly by the volumes of the combustible composition and heat-absorbing material. Since the volume or quantity of the combustible composition cannot be decreased to inflate a definite bag, the volume of the heat-absorbing material is made as small as possible by appropriate selection of the material and/or skilful arrangement in packing it into the gas generator.

When the gas generator is actuated and the bag is inflated, the heat-absorbing material achieves its mission of reducing the gas temperature with a considerable increase in its own temperature. Then, the housing of the gas generator is heated by heat conduction from the heat-absorbing material to a temperature above the gas temperature in the inflated bag. When the inflated bag diminishes or deflates at least partially after accomplishment of its role of protecting a car passenger during a collision, the bag may possibly come into contact with the heated housing and be burnt. When the bag is made of a synthetic resin, there is a fear of evolution of a noxious gas upon burning of the bag. Besides, there is a danger of a person being burnt by contact with the heated housing.

It is an object of the present invention to provide a safety apparatus of the described type, which apparatus includes a guard member for protecting the once inflated bag and a person staying near the bag from coming into contact with the heated housing of the gas generator.

A safety apparatus according to the invention comprises a conventional gas generator which includes a housing with a plurality of gas outlets formed in a wall thereof, a combustible gas-generating composition disposed in the housing and a heat-absorbing material disposed in the housing between the gas-generating composition and the outlets; a conventional inflatable bag which is folded and arranged such that the housing extends into the bag while the mouth of the bag is kept in a fixed position with respect to the housing. Accordingly, the bag is inflated when a combustion gas is discharged from the outlets of the housing. The apparatus is characterized by further comprising a guard member which is adapted in shape to the housing of the gas generator and placed between the outer surface of the housing and the bag. A portion of the guard member is of such a specific construction that this portion covers at least a portion of the gas outlets of the housing and extends away from the aforementioned wall of the housing when the gas is discharged from the outlets, but this portion is inseparable from the remaining portion of the guard member.

The thus extended portion of the guard member supports the bag when the bag approaches the housing subsequently to inflation and prevents the bag from coming into contact with the heated housing.

According to this invention a guard member is shaped to provide a hollow which is generally similar in shape but slightly larger than the interior of the housing. The guard member is arranged at a fixed position with respect to the housing so that the housing is received in the hollow and spaced from the guard member. A plurality of parallel slits or notches are formed in a wall of this guard member so that each covers a portion of the gas outlets of the housing. Each of the rectangular sections between two slits is expanded when the gas generator is actuated.

Other features and advantages of the invention will become apparent from the following detailed description of preferred embodiments thereof with reference to the accompanying drawings, wherein.

Figure 1:
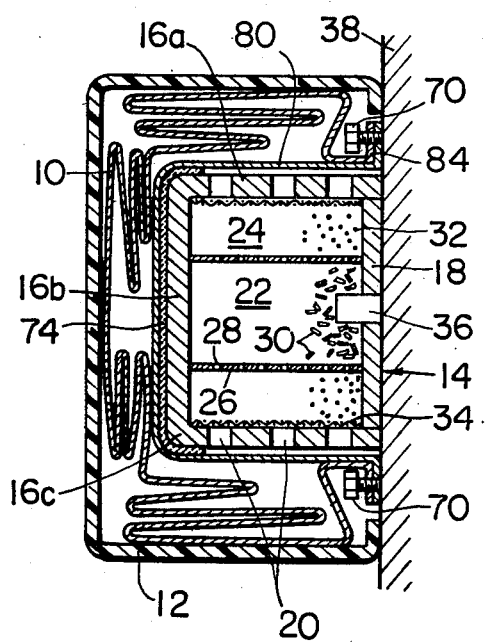
FIG. 1 shows a longitudinal section of a safety apparatus for the protection of a car passenger as a preferred embodiment of the invention.

In a safety apparatus for the protection of a car passenger shown in FIG. 1, an inflatable bag 10 is folded up and received in a generally cup-shaped protector 12 such that the mouth 10a of the bag 10 substantially coincides with the open end of the protector 12. The folded bag 10 is positioned relatively close to the bottom and side wall of the protector 12 so that a generally cylindrical space is left in the protector 12 to receive therein a gas generator 14. The gas generator 14 has a cylindrical or cup-shaped housing 16 with a fixed lid member 18 and a plurality of gas discharge holes or outlets 20 formed in the peripheral wall 16a. The interior of the housing 16 is divided into a central cylindrical combustion chamber 22 and a cooling chamber 24 surrounding the former chamber 22 by a cylindrical partition 26 which has a multiplicity of apertures 28. The combustion chamber 22 is charged with a combustible gas-generating composition 30 which is usually in the form of pellets, and the cooling chamber 24 is filled with granular heat-absorbing material 32 which is prevented from being discharged through the holes 20 by a porous spacer 34, e.g., of a wire screen. The gas generator 14 and the protector 12 are mounted on a support member 38, e.g., a central portion of a steering wheel. An electrically initiatable igniter 36 is attached to the lid member 18 to extend into the combustion chamber 22.

Upon initiation of the igniter 36 in a collision of the automobile, the composition 30 is ignited and underdoes a self-sustained combustion with evolution of a high temperature combustion gas. The combustion gas is ejected through the holes 20 generally radially of the housing 16 after it is cooled sufficiently by passing through the column of the heat-absorbing material 32. Consequently, the bag 10 is inflated and expands mainly in the axial direction of the gas generator 14. The protector 12 is made of a fragile material and/or of a fragile construction, so that it is broken at least at its bottom by the impulsive inflation of the bag 10. The thus inflated bag 10 offers cushion against the forward movement of the driver by inertia and prevents him from colliding with the steering wheel 38. In the above described respects, both in arrangement and in operation, the safety apparatus of FIG. 1 does not differ from conventional apparatus for the same purpose.

Figure 2:
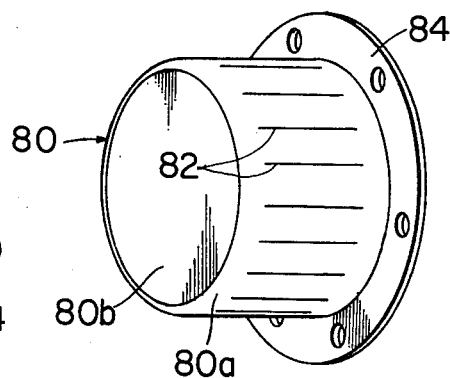
FIG. 2 is a perspective view of a gas generator covered with a guard member as part of the apparatus of FIG. 1.
Figure 3:
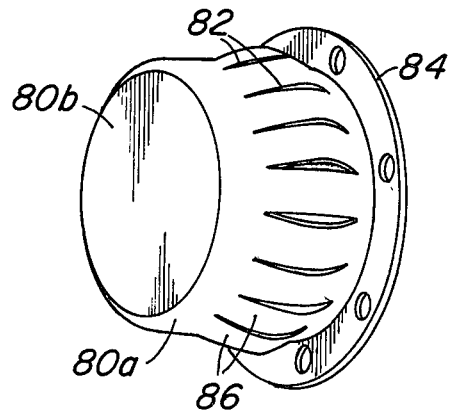
FIG. 3 shows the same as FIG. 2 but in a state after actuation of the gas generator.
Figure 4:
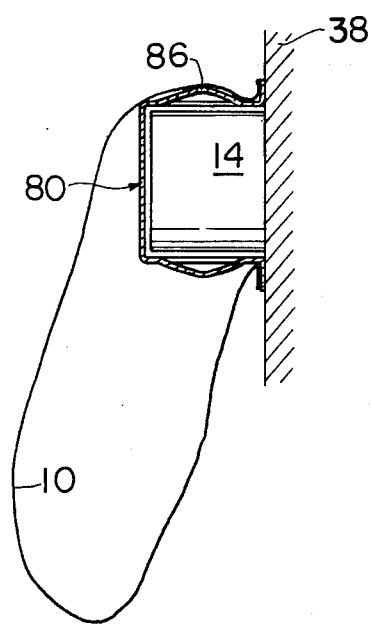
FIG. 4 is a sketch of the apparatus of FIG. 1 in a state a little time after operation.

Referring now to FIGS. 1–3 a guard member 80 is arranged in the protector 12 to enclose the gas generator 14 at a short distance therefrom.

The guard member 80 is made of a metal or a heat-resistant synthetic resin and shaped cup-like with a flange 84 at its open end as seen in FIGS. 2 and 3. The inner diameter and the depth of the guard member 80 are slightly larger than the outer diameter and height of the housing 16 of the gas generator 14, respectively. The peripheral wall 80a of the guard member has a multiplicity of axial slits 82 formed in the peripheral wall 80a of the guard member 80, as shown in FIG. 2. The slits 82 terminate at certain distances from the bottom 80b and flange 84 of the guard member 80. An adhesive, however, may be applied to the slits 82. The guard member 80 is assembled with the other elements of the safety apparatus such that the housing 16 is covered with but separate from the guard member 80 both axially and radially. The flange 84 of the guard member 80 is fastened to the support member, e.g., the central region of the steering wheel 38 with bolts 70, for example.

With respect to the gas generator 14 which has the radially formed gas discharge holes 20, the temperature of the housing 16 after completion of the combustion of the composition 30 is highest at its shoulder region 16c and the bottom 16b. The space between the housing 16 and the guard member 80 or 80a is helpful for lessening heat transfer from the housing 16 to the guard member 80 or 80a. The heat transfer can be suppressed further when the space is filled locally with a solid heat-insulating material indicated at 74 in FIG. 1 to cover the shoulder region 16c and the outer surface of the bottom 16b. Owing to these slits 82, the peripheral wall 80a expands outwardly or radially when the gas generator 14 is actuated. Then, the slits 2 are enlarged as shown in FIG. 3, and the expansion of the wall 80a is most noticeable at each of rectangular regions 86 interposed between neighboring two slits 82. When the bag 10 droops subsequently to full inflation, the bag 10 rests locally on the guard member 80 as seen in FIG. 14. Due to the radial expansion on the wall 80a, the bag 10 is held at a sufficient distance from the housing 16 of the gas generator 14. The bag 10 is fully protected against coming into contact with the housing 16. The guard member 80 of FIG. 2 has the advantages of ease of construction and having no fear of ripping the bag 10 or fear of local separation of the guard member 80. Besides, heat transfer by radiation from the housing 16 to the bag 10 can be minimized by the use of the guard member 80.

Figure 5:
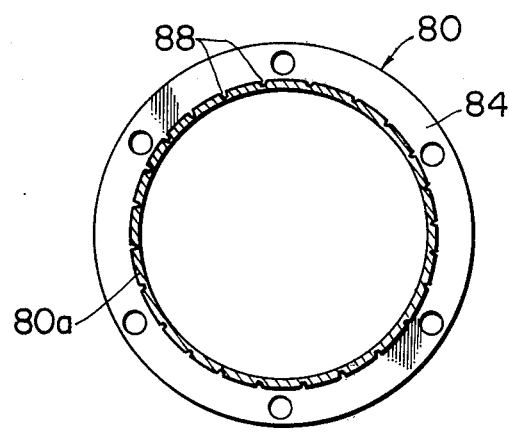
FIG. 5 is a cross section of a guard member according to this invention.

It will be apparent that the slits 82 of the guard member 80 can be replaced by similarly arranged notches 88 as shown in FIG. 5. The heat-insulating material 74 of FIG. 1 may be installed between the bottom 16b of the housing 16 and the bottom 80b of the guard member 80.

In any of the above described embodiments, a guard member according to the invention has no particular projection and occupies only quite a small space around the gas generator 14 until the operation of the apparatus. The installation of the guard member, therefore, causes little enlargement of the described safety apparatus as a whole.

What is claimed is:

1. A safety apparatus comprising:
 a gas generator including a housing with a plurality of gas outlets formed in a wall thereof, a combustible gas-generating composition disposed in said housing, and a heat-absorbing material disposed in said housing between said gas generating composition and said outlets;
 an inflatable bag folded and arranged such that said housing extends into said bag, the mouth of said bag being in a fixed position with respect to said housing, so that said bag is inflated when a gas is discharged from said outlets; and a guard member fixedly arranged between said housing and said bag, said guard member having a hollow shape generally similar to and slightly larger than the exterior of said housing, a plurality of slits formed in a wall of said guard member overlying said outlets, said slits being separated by portions of said guard member which expanded outwardly, enlarging said slits, when gases are discharged from said outlets.

2. Apparatus as claimed in claim 1 wherein each of said walls are generally cylindrical.

3. Apparatus as claimed in claim 1, wherein a portion of the space between said housing and said guard member is filled with a heat-insulating material, said outlets opening into the remaining portion of said space.

4. Safety apparatus comprising:
 a gas generator including a housing with a plurality of gas outlets formed in a wall thereof, a combustible gas generating composition disposed in said housing, and a heat-absorbing material disposed in said housing between said gas-generating composition and said outlet;
 an inflatable bag folded and arranged such that said housing extends into said bag, the mouth of said bag being in a fixed position with respect to said housing, so that said bag is inflated when a gas is discharged from said outlets; and a guard member fixedly arranged between said housing and said bag, said guard member having a hollow shape generally similar to and slightly larger than the exterior of said housing, a plurality of notches formed in a wall of said guard member overlying said outlets, said notches being separated by portions of said guard member which expand outwardly, ripping said guard member along said notches, when gases are discharged from said outlets.

5. Apparatus as claimed in claim 4, wherein each of said walls are generally cylindrical.

6. Apparatus as claimed in claim 4 wherein a portion of the space between said housing and said guard member is filled with a heat insulating material, said outlets opening into the remaining portion of said space.

* * * * *